(12) United States Patent
Davidovich et al.

(10) Patent No.: US 9,324,041 B2
(45) Date of Patent: Apr. 26, 2016

(54) FUNCTION STREAM BASED ANALYSIS

(71) Applicant: SparkBeyond Ltd., Zikhron-Yaakov (IL)

(72) Inventors: Sagie Davidovich, Zikhron-Yaakov (IL); Meir Maor, Netanya (IL); Ron Karidi, Herzliya (IL); Denis Wainshtein, Shlomy (IL)

(73) Assignee: SparkBeyond Ltd., Zikhron-Yaakov (IL)

( * ) Notice: Subject to any disclaimer, the term of this patent is extended or adjusted under 35 U.S.C. 154(b) by 0 days.

(21) Appl. No.: 14/595,394

(22) Filed: Jan. 13, 2015

(65) Prior Publication Data

US 2015/0206068 A1    Jul. 23, 2015

Related U.S. Application Data

(60) Provisional application No. 61/929,072, filed on Jan. 19, 2014.

(51) Int. Cl.
*G06N 99/00*  (2010.01)
*G06N 5/04*  (2006.01)

(52) U.S. Cl.
CPC ............... *G06N 99/005* (2013.01); *G06N 5/04* (2013.01)

(58) Field of Classification Search
CPC ................................................ G06N 99/005
See application file for complete search history.

(56) References Cited

PUBLICATIONS

I. Neamtiu et al., "Understanding Source Code Evolution Using Abstract Syntax Tree Matching", Proc. ACM Mining Software Repositories, May 2005, 5 pages.*
A. Shabtai et al., "Automated Static Code Analysis for Classifying Android Applications Using Machine Learning", 2010 IEEE Int'l Conf. on Comp. Intelligence and Security, pp. 329-333.*
B. Sanz et al., "On the Automatic Categorisation of Android Applications", Proc. 9th IEEE Consumer Comm. and Networking Conf., 2012, pp. 149-153.*

* cited by examiner

*Primary Examiner* — Kakali Chaki
*Assistant Examiner* — Vincent Gonzales

(57) ABSTRACT

A method of identifying an element. The method comprises setting a training set comprising a plurality of data units, selecting a function group of building block functions adapted for processing said plurality of data units, combining members of said function group to create a stream of a plurality of combination functions each complied from at least two members of said function group, applying each member of said stream on each of said plurality of data units to create a set of results, analyzing said set of results to identify a correlation between at least one member of said stream and a target variable for an analysis of said plurality of data units, and outputting said at least one member or an indication thereof.

21 Claims, 3 Drawing Sheets

FUNCTION STREAM BASED ANALYSIS

RELATED APPLICATION

This application claims the benefit of priority under 35 USC 119(e) of U.S. Provisional Patent Application No. 61/929,072 filed Jan. 19, 2014, the contents of which are incorporated herein by reference in their entirety.

BACKGROUND

The present invention, in some embodiments thereof, relates to data analysis and, more specifically, but not exclusively, to methods and systems of identifying and selecting an efficient function for data records classifying and/or for estimating and/or ranking data according to the data records classification.

As organizations, sensors, diagnostic tools and monitoring systems generate and retain large amounts of data; it becomes increasingly important to classify effectively this data. Data may be classified using information about the data.

However, information about the data may not be useful to all users because such information lacks context. Therefore, in the recent years, various data mining tools and algorithms are used.

Gathered data usually includes a set of records where each record includes a set of features each representing and individual measurable heuristic property of a phenomenon or an event being monitored, for instance over time and/or in iterations. Identifying which of the features of the records is efficient for classification and/or evolution is a key step in any data mining process.

A typical feature engineering process for identifying efficient features consists of a training-set preparation where data is structured and normalized. Then, manual analysis of the structured and normalized data is done to identify patterns and regularities. Now, hypothesis is generated by formalization and of observed patterns and implementation of tools for their detection. The hypothesis is evaluated by measurement of the statistical significance and correlation strength for the hypothesis. Now, the features are integrated into a model which the performance thereof is evaluated on a new dataset. Errors are analyzed for investigating repeating errors causes and regularities. According to this analysis iterative hypothesis generation process may be applied.

SUMMARY

According to an aspect of some embodiments of the present invention there is provided a method of identifying an element. The method comprises setting a training set comprising a plurality of data units, selecting a function group of building block functions adapted for processing the plurality of data units, combining members of the function group to create a stream of a plurality of combination functions each complied from at least two members of the function group, applying each member of the stream on each of the plurality of data units to create a set of results, and analyzing the set of results to identify a correlation between at least one member of the stream and a target variable for an analysis of the plurality of data units; and outputting the at least one member or an indication thereof.

Optionally, the set of results comprises a plurality of feature vectors each generated by applying one of the members of the function group on each of the plurality of data units.

More optionally, the target variable is a classification at a desired ratio; the analyzing comprises identifying which of the plurality of feature vectors having features classified at the desired ratio.

Optionally, the combining comprises using an output parameter of a first member of the function group as in input parameter of a second member of the function group.

Optionally, the combining comprises mapping a statistical usage of members of the function group in a plurality of code samples and selecting members of the function group for creating the plurality of combination functions according to the mapping.

Optionally, the combining comprises mapping a statistical usage of members of the function group in a plurality of code samples and defining an order for applying the members of the function group according to the mapping.

Optionally, the selecting comprises: analyzing the plurality of data units to identify automatically at least one common data type and selecting the function group of building block functions according to the at least one common data type from a dataset of a plurality of building block functions.

More optionally, the selecting the function group of building block functions is performed using a hierarchal data type model.

More optionally, the selecting the function group of building block functions is performed according to available data unit type conversion functions.

More optionally, the plurality of building block functions are clustered to a plurality of function clusters each associated with at least one data unit type. The selecting comprises matching between the common data type and a respective the at least one data unit type of at least one of the plurality of function clusters and selecting the at least one function cluster as the function group.

Optionally, each of the plurality of combination functions is generated by compiling at least two members of the function group as nodes of a tree representing a respective the combination function.

More optionally, the tree is an abstract syntax tree (AST).

Optionally, each of the plurality of combination functions is generated to comply with a set of constraint rules.

Optionally, the at least one member is a function for classifying data.

Optionally, the at least one member is a predictive function for predicting an outcome or an event.

According to an aspect of some embodiments of the present invention there is provided a system of identifying an element. The system comprises an interface which accesses a training set comprising a plurality of data units, a processor, an interface which accesses a function dataset to select a function group of building block functions adapted for processing the plurality of data units, and a selection module which uses the processor to combine members of the function group to create a stream of a plurality of combination functions each complied from at least two members of the function group, to apply each member of the stream on each of the plurality of data units to create a set of results, to analyze the set of results to identify a correlation between at least one member of the stream and a target variable for an analysis of the plurality of data units, and to output the at least one member or an indication thereof.

According to an aspect of some embodiments of the present invention there is provided a method of identifying an element. The method comprises setting a training set comprising a plurality of data units, selecting a function group of functions adapted for processing the plurality of data units for generating a stream of functions, applying each member of the stream of functions on each of the plurality of data units to create a set of results, analyzing the set of results to identify a correlation between at least one member of the stream of functions and a target variable for an analysis of the plurality of data units, and outputting the at least one member or an indication thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
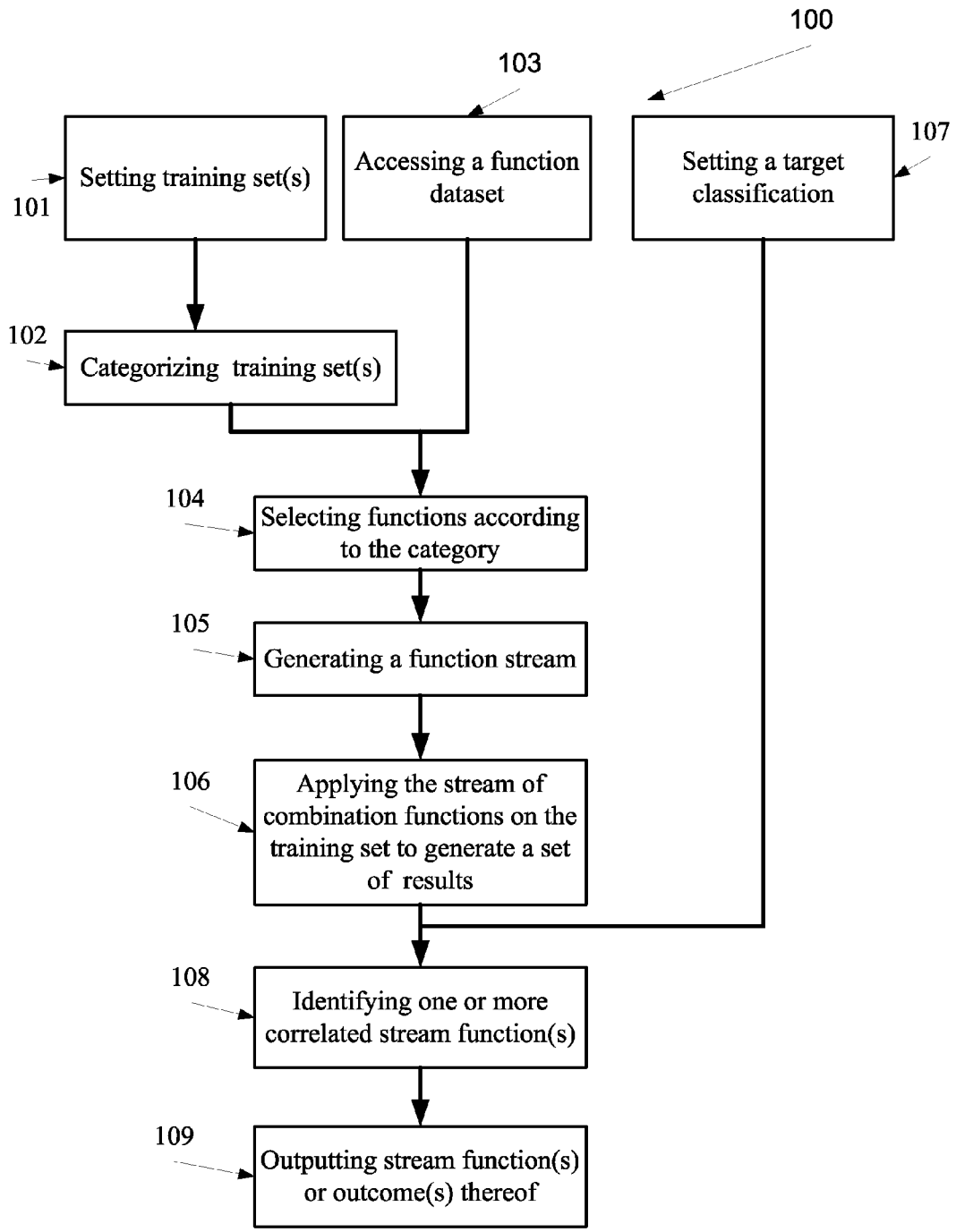
FIG. 1 is a flowchart of a process of automatically identifying one or more functions which outputs one or more data classifying or predictive features when applied on a set of data units of a certain type, according to some embodiments of the present invention.

The present invention, in some embodiments thereof, relates to data analysis and, more specifically, but not exclusively, to methods and systems of identifying and selecting an efficient function for data records classifying and/or for estimating and/or ranking data according to the data records classification.

According to some embodiments of the present invention, there are provided methods and systems for identifying one or more analysis functions for a classification of data units of a training set, such as records and events, by compiling a stream of combination functions from members of a dataset of building block functions and applying the stream on the data units. The training set may be a computer readable data sample of various types and forms. The methods and systems may allow automatically identifying the analysis functions without manually defining the training set records and/or without manually combining and/or classifying the building block functions.

Optionally, the combination functions are ordered and/or generated according to a statistical analysis of the prevalence of building block functions in different code samples.

Optionally, the combination functions are generated by compiling selected building block functions as nodes of trees, for instance abstract syntax trees (ASTs). In such embodiments, tree edges may be weighted to reflect the suitability of different building block functions to be part of a common combination function.

Optionally, the building block functions are automatically selected to match the data unit type of the data units of the training set. Optionally, a data unit type model, which may be hierarchal, is used for matching different data unit types for the analysis of the received training set. Optionally, conversion functions are used to combine building block functions of different data unit types for the analysis.

According to some embodiments of the present invention, there are provided methods and systems for identifying one or more analysis functions by compiling a stream of functions selected from one or more datasets of functions and applying the stream on the data units of a training set. The methods and systems may allow automatically identifying the analysis functions without manually defining the training set records and/or without manually creating the stream functions. For example, functions in the accessed databases may be automatically created from an analysis of code samples, outcomes of function selection and/or generation processes and/or from any other source of functions. Automatically gathered functions may be categorized by various function categorization methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a process of automatically identifying one or more classifying or predictive functions which outputs one or more data classifying or predicting features when applied on a set of data units of a certain type, according to some embodiments of the present invention. For brevity, classifying or predictive are used herein interchangeably. The one or more classifying functions are optionally combination functions automatically composed from a set of building block functions, for example 2, 5, 10, 100, and 1000 building block functions or any intermediate or larger number of building block functions. The classifying functions are optionally selected based on an outcome of one or more training session(s) wherein a stream of functions, optionally infinite, is generated from suitable building block functions from a function index and applied iteratively or non iteratively, for example recursively, on a training dataset. Optionally, the classifying functions are selected from an analysis of feature vectors generated during the function applying process.

The process may be used to identify classifying functions which classify data record of various types, optionally without manually indicating the type of the data records of the training set and/or without manually selecting functions from the function dataset. The classifying functions are optionally complex functions which are automatically composed of a number of building block functions. These combination functions may be combined according to an analysis of a corpus of code samples indicating which functions are logically combined and how. The corpus of code samples may be open source code same database, such as MySQL database, RethinkDB database, SAPDB. For example, a corpus of code samples is analyzed to identify which building block functions are used in each code sample. Then, a statistical analysis of the corpus of code samples is held to reflect statistically the prevalence of each pair of building block functions from a dataset of building block functions in the corpus. The statistical analysis allows mapping statistical correlation of using each pair of building block functions in code sections, such as software codes. The statistical correlation may be represented as weights on edges of a graph wherein the nodes are building block functions. A statistical correlation receives a weight indicating the prevalence of both building block functions of a pair in code sections.

Optionally, the code samples, which are analyzed for statistics, comprise outputs of the process depicted in FIG. 1, for example analysis functions selected by this process and/or any other analysis function selection process. Optionally, code samples include feature extractors/classifiers written by experts with regard to various problems and/or dataset types. The analysis function may be, for example, a classifying function for data classification and/or a predictive function for outcome and/or event estimation.

Figure 2:
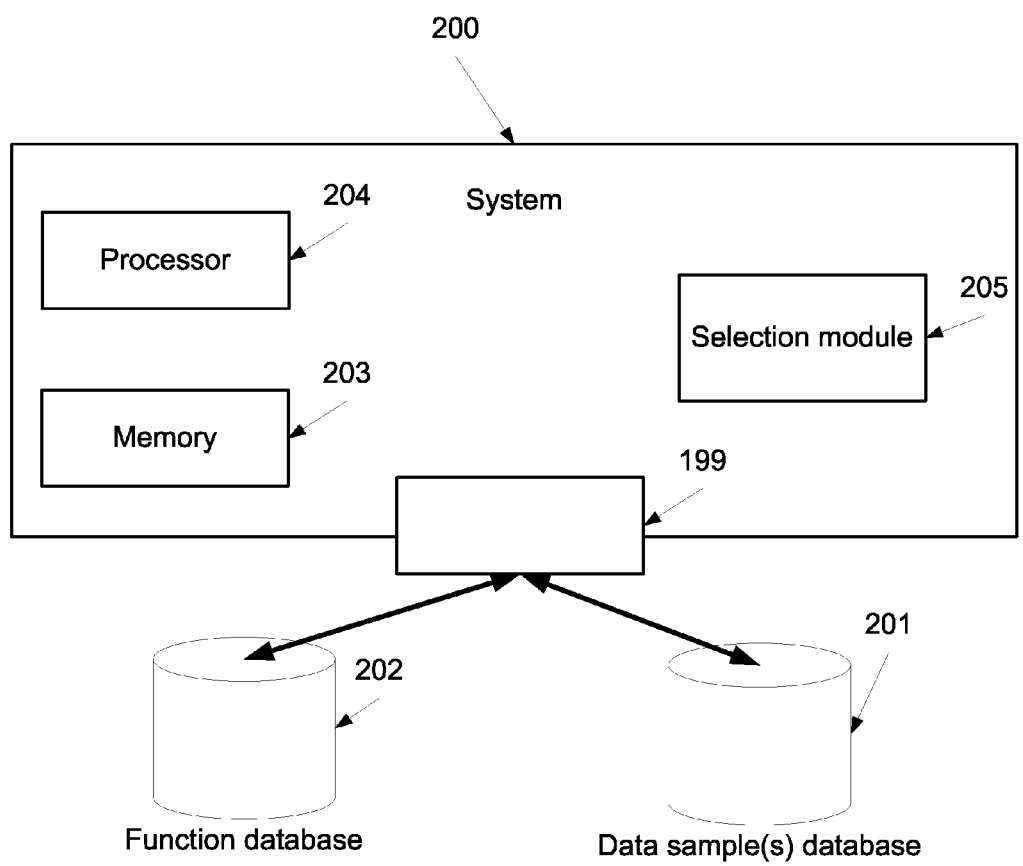
FIG. 2 is a schematic illustration of a system for identifying a classifying or a predictive function, for example by implementing the method depicted in FIG. 1, according to some embodiments of the present invention.

Reference is also made to FIG. 2, which is a schematic illustration of a system 200 for identifying a classifying function, for example by implementing the method depicted in FIG. 1, according to some embodiments of the present invention.

The system 200 includes one or more interfaces 199 to access one or more training set databases storing the training set 201 and a function database 202 storing a dataset of functions, and optionally a memory 203 to store feature vectors which document results of the applying of functions from the dataset of functions 202, for example as described below. The system further includes one or more processor(s) 204 which executes training sessions 200 according to instructions from a selection module 205. The operations described below are optionally implemented by the processor 204. The training set includes a plurality of individual records, also referred to as data units, which describe events, bids, potential client characteristics, sensor readings, log records, and/or any other set of records numerical and/or any textual records which reflect events and/or measurements and optionally one or more event and/or measurement outcomes, estimations or evaluations. Optionally, the event and/or measurement outcome, estimation or evaluation is a binary indication. For example, when a record reflects a medical record of a patient going through a certain procedure, the outcome indicate whether the procedure succeeded. Such a record may include a textual description of a diagnosis given by physicians in the past, historical measures, such as vital signs, blood tests, hospitalization data and/or the like. Optionally, the event and/or measurement outcome, estimation or evaluation is a numeric indication. For example, when a record reflects a line item or any other advertisement bid, the outcome is a numeric indication indicating a return of investment (ROI) and/or an effective bid value and/or the like.

Optionally, the system 200 derives one or more training sets from one or more existing databases, for instance by pulling data and/or receiving pushed data and/or receives one or more training sets inputted by an operator.

Optionally the depicted system and method are used for identifying stream functions which may be used for efficient data analysis and/or monitoring. For example, the selected functions are used for classifying real time events and/or recorded events and/or current and/or historical sensor and/or crawling reading. In another example, the selected functions are used for predictive analysis for events and/or outcomes, analyzing real time or historical data to predict a future outcome, for instance for investment management, alerting, resource allocation and/or the like.

As shown at 101, one or more training set(s), for brevity referred to herein as a training set, comprising a plurality of records, referred to herein also as data units, is set, for example received or accessed, for instance via the interface 199 from data sample database 201.

Optionally, the training set includes uncategorized data units and/or loosely categorized data units, namely data units wherein the data unit type is not identified or marked. In such embodiments, as shown at 102, the data units in the training set may be automatically categorized, for instance by a semantic analysis and/or according to a match with a set of templates. Exemplary categories may be geo-coordinate records, textual records, unique identifier records, uniform resource locator (URL) records, and/or the like. In such embodiments, the training set may be categorized according to the data unit type of some or all of the documented data units.

As shown at 103, a dataset of building block functions, referred to herein as a building block function dataset is accessed. The building block function dataset is optionally, an indexed repository of executable functions, also referred to herein as a function index. The building block function dataset includes a set of building blocks functions, functions which may be used to compose combination functions, for example as described below.

Each building block function is optionally indexed by the parameter type thereof, for example the type(s) of received parameter(s) (i.e. a data unit from the training set) and the type(s) of return parameter(s), and for example what is the type of the output values. This allows, as shown at 104, selecting a group of functions according to the type of data units in the training set. This allows selecting functions which are adapted for the analysis of data units in the training set.

The selection is optionally made using a selection module 206 executed using a processor 205 of the system 200.

Optionally, a data unit type model that defines relationships, optionally hierarchal, between data unit types is provided, for example in the memory 203, is used to select group of functions which match a number of data unit types. For example, the type model defines sub-types which represent more concrete types and super-types which represent more abstract types. Any sub-type may be assigned to a super-type. Optionally, a super data unit type is selected when data units of a sub-type are identified and/or vice versa. For example, a List class may be a sub-type of Iterable class/interface. In such a manner, a List class/interface could be assignable to an Iterable class/interface and a function Size: Iterable→Int accepts a List.

Optionally, conversions or promotions which allow for example assigning functions receiving or outputting parameters of one data unit type for processing data unit of another data unit type may be used. In such embodiments, the selected group of functions may be enhanced by function which can be converted or promoted. For instance an Integer value into a Long value conversion function may be provided. Other conversion examples may include implicit conversion of an Integer to a Double, so a method math.sqrt Double→Double could accept an Integer.

According to some embodiments of the presented invention, some or all of the building block functions are formulated as building blocks of a function combining a number of functions, for instance as input parameters and/or as input parameters of input parameters, as a variable or a weight in an equation, and/or as a term defining element or rule. Optionally, data is wrapped with a lookup table and/or relation traversal functions, to allow treating data and code in a uniform way. In such embodiments, building block functions and/or combination functions are selected for processing the training set. For example, when a data table consisting of 3 columns: country name, leader name, population size is received, the methods: leaderName: String→String and populationSize: String→Int may be created.

Optionally, as shown at 105, a stream of combination functions, referred to herein as a function stream, is generated to process iteratively the training set. Each combination function is generated by combining building block functions from the functions selected from the function index. An example of a combination function compilation of the following functions: $f(a)$=inputText: String; $f(b)$=toLowerCase: String→String; and $f(c)$=tokenize: String→Array<String> may be tokenize(toLowercase(inputText)).

Optionally, the combination functions are optionally generated according to a composition model indicative of how to combine different building block functions. Optionally, the order of the combination functions in the function stream is determined by the composition priority model.

For example, a composition priority model generated by an analysis of a plurality of code samples from one or more open source repositories and/or logs of past performance and used for estimating a value of each of a plurality of different optional combination functions. Optionally, type constraints are applied on the generation of combination functions to ensure that only valid combination functions are produced. For example, constraints utilize types of the input parameter and/or return types of generated combination functions, including a higher order functions and type parameters.

As shown at 106, each function from the stream of combination functions is applied, optionally separately, on each of some or all of data units of the received training set. The applying of each of the combination functions in the stream on the data units creates a set of results optionally represented as a feature vector. Applying some or all of the stream functions creates a feature vector set comprising a plurality of feature vectors. For example: a function that identify words in a string of characters produces a feature vector documenting lists of words when applied on a data unit, such as a text column, in the training set, which is optionally categorized. In such an embodiment, the list is a feature value and each one of the words may be a feature value or a feature sub value.

As described above, the applied stream functions are functions adapted to an analysis of data units of a training set having data units of a certain data unit type. For example, the selected functions result in values useable as input values for another function when a combination function is generated and/or as feature values that can analyzed in the future. Optionally, when the data unit type is a numeric value, the function returns a number useable in a machine learning algorithms. An exemplary numeric function is log(a+b). An exemplary Boolean function is ngrams(inputText).map (ngram=>stem(ngram)).contains("tower"). Optionally, in such functions, discretization and/or normalization techniques may be applied, for example linear discretization, equal mass discretization, linear, and/or logarithmic normalization methods. Optionally, general functions are used where regardless of the type of an inputted feature value, a specific value is returned. For example, the function returns a Boolean value—a potential Boolean feature $f(data)$=value. Such functions may be applied on multiple types of training sets. Optionally, the function returns a feature value of a collection type, for instance where any member of the collection may be a Boolean value, for instance contains ($f(data)$, value) which denotes a function indicating whether a certain value exist in $f(data)$ and/or a numeric value, for instance count($f(data)$, value) which denotes a function counting how many times a value appeared in $f(data)$ and/or frequency($f$ (data), value) which denotes a function indicating frequency of value in $f(data)$. Optionally, the function returns a sparse matrix of potential feature values. In such a case all feature values represented by the sparse matrix are used as potential features and are evaluated.

Optionally, a function may have an input wherein a data unit appears multiple times. For example, when the data input is an integer A and the function is "add" denoted as +, a set of functions may be described as follows:

A;
A+A;
(A+A)+A; and
(A+A)+(A+A).

Reference is now made to a description of generating and applying stream functions from a stream of functions, optionally infinite, for instance a stream of building block functions and combination functions is generated from the selected building block functions and applied on the training set to generate feature vectors.

Optionally, a set of function combination rules is defined per data unit type. In use, building block functions are combined to create combination functions under the respective set of function combination rules. Optionally, each combination function is generated as an abstract syntax tree (AST) of building block functions which optionally comply with the matching set of constraint rules of the matching type.

Optionally, a cost model is defined for ordering the generated combination functions in the stream. In the AST, each pair of building block functions of the combination function has a cost associated to it based on how probable a composition that includes them both is. For brevity, placing a building block function x as the $i^{th}$ parameter of building block function y has cost $C(x, y, i)$ determined by the cost i prioritization model. The cost of a certain combination function is the sum of all costs of the edges connecting the building block functions which comprise the certain combination function.

Optionally, ASTs are built from a top down approach, starting with a combination function producing a feature vector.

For instance, the following is used to create an AST representing a combination function:

ASTStream(returnType,maxCost,parentFunction):
    Iterator<ASTNode> where returnType denotes a conforming type/category, maxCost denotes a maximum total cost, parentFunction denotes a cost of the top-most function in a produced AST, since the cost of a function is dependent on how it is used.

Each node in the AST is built from a building block function and optionally a list of one or more AST nodes which are received as parameters thereof.

Optionally, an infinite stream of ASTs representing combination functions is produced by repeatedly call ASTStream in an iterative deepening fashion, increasing maxCost with each invocation and filtering results with a cost lower than the previous maxCost so as to prevent duplicates.

Optionally, the ASTStream is iterated over all building block functions and/or indexed combination functions with a returnType conforming to a requested return type and for each of the building block functions and/or indexed combination functions, valid parameters are constructed by a recursive calling.

For example, given the following building blocks:
    constant integer 1 (a constant can be viewed as a function with no parameters);
    constant strings "foo" and "fubar"; and
    a size function: String=>Integer;
    all ASTs which return an Integer are built. There are two building block functions, used as building blocks, which return an Integer: the constant "1" and the size function. The constant 1 takes no argument and as a top level function, produces only one AST containing just the constant 1. ASTNode(1, Nil). The size function returns int by taking a single String argument and finding all possible arguments as streamAST called recursively, with String as the returnType, with reduced maxCost since we already used the method size which has some cost and with the method size as the parent function. Such an invocation produces a stream of two ASTs:
ASTNode("foo",Nil); and
ASTNode("fubar",Nil).
where the final result is:
ASTNode(1,Nil);
ASTNode(size,List(ASTNode("foo",Nil))); and
ASTNode(size,List(ASTNode("fubar",Nil)))

When a function receives two or more arguments, ASTStream is called recursively for the first argument and for every possible assignment of the first argument the maxCost is lowered accordingly and ASTStream is called recursively to find all assignments for the next argument.

Optionally, some of the combination functions and/or building block functions are higher order functions are functions which have one or more functions as input parameters. Enumerating over function parameters for a higher order functions is done by adding a building block function with no arguments to the function pool representing the input for the functional parameter and recursively calling ASTStream to build ASTStreams with a return type conforming to the desired function return type.

An exemplary stream given the following building block functions:
   input x–Double;
   input s–String;
   length–String→Int;
   multiplication(*)–(Double,Double)→Double;
   will get for any output type the following:
   x;s; length(s); x*x; length(s)*x; x*x*x; length(s)*x*x; and so on and so forth.

As shown at 107, a target variable for classifying the data units, is set, for example manually received by a user and/or automatically defined according to a set of goals, optionally user adapted and/or defined. For brevity, the target value is referred to herein as target classification. The target classification may be a set of rules, a ratio reflecting a desired data segmentation and/or a question, for example which parameters of a data units are indicative of a desired event, for instance which user characteristics of a data unit representing a visit of a browsing user in a webpage are commonly found in purchasing consumers, which soil characteristics of a data unit representing measurements of a soil specimen are commonly found in a stratum of natural resources, such as gold, diamonds, tanzanite, nickel, uranium and/or natural gas, and which electronic consumption pattern of a data unit representing electronic consumption measurements in a household are commonly found in a household having a malfunctioning consumer product, such as refrigerator, washing machine and/or the like.

Now, as shown at 108, the result of applying the function stream, for example a set of feature vectors, is analyzed to identify which of the stream function(s), for instance simple or combination function(s), generate an outcome, for example a feature vector that is correlated with the target classification. These one or more functions are referred to herein as analysis functions. For example, the analysis functions are analysis functions which segment the feature values in respective feature vectors in a manner that optimally or at least highly correlated with the target classification. The correlation may be a statistical correlation evaluated using techniques such as Chi-Squared, Information gain, Pearson correlation and/or others evaluation techniques.

Optionally, each one of the selected analysis functions is applied in a plurality of iterations. The outcome of each of the plurality of iterations is stored in a pool of intermediate feature vectors. Optionally, de-duplication and/or selection techniques are applied. Optionally, during the process intermediate feature vectors having a low correlation with the go through a feature selection process, where the least valuable and redundant feature vectors, in light of the target classification, are removed. After the removal, a limited set of the most correlated and independent feature vectors are selected.

Optionally, as shown at 109, the function(s) of the set of the most correlated and independent feature vectors and/or the set of the most correlated and independent feature vectors, and/or the feature value(s) indicated by the most correlated and independent feature vectors, are used to build one or more predictive models. The predictive models may be built with regression and/or classification algorithms. Different metrics, for example Precision, F-measure, and area under Receiver operating characteristic (ROC) curve, may be used to evaluate the performance of each of the predictive model(s) and choose accordingly.

Figure 3:
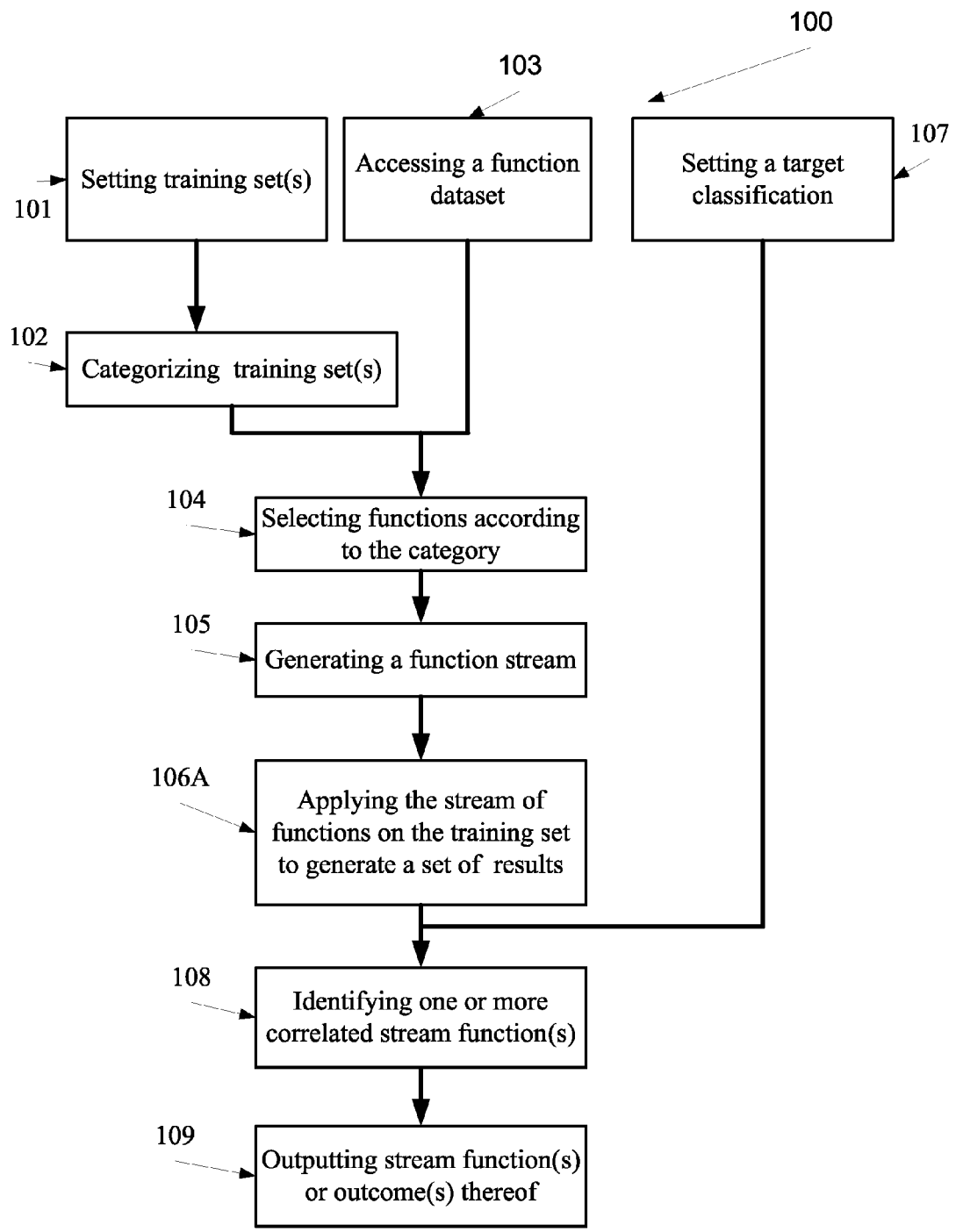
FIG. 3 is a flowchart of a process of automatically identifying one or more functions which outputs one or more data classifying or predictive features when applied on a set of data units of a certain type, according to some embodiments of the present invention.

Reference is now made to FIG. 3, which is a flowchart of a process 300 of automatically identifying one or more classifying functions using a database of compiled stream functions, according to some embodiments of the present invention. In this method Blocks 101-105 and 107-109 are identical to Blocks 101-105 and 107-109 in FIG. 1; however, in this process stream functions are not compiled but rather selected from one or more databases—106A. In such embodiments, functions may be any type of functions which are manually and/or automatically added to a function database. For example, functions may extracted from a corpus of code samples, extracted from outcomes of running a analysis function generation method, and/or gathered from crawling or otherwise analyzing code databases.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor and a database is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method of identifying at least one classifying or predictive function which outputs at least one data classifying or predicting feature when applied on a set of data units of a certain type, comprising:
   accessing, by said processor via an interface, a training set stored as a computer readable data sample of various types and forms in a data sample database, said training set comprising a plurality of data units representing a member selected from the group consisting of: records, events, measurements, estimation, and evaluation;
   selecting, by said processor, a function group of building block functions which are adapted for processing said plurality of data units, said building block functions stored in a function database accessible by said processor via said interface;
   combining, by said processor, building block function members of said function group to create a a plurality of composed functions each compiled from at least two building block function members of said function group;
   generating a stream of functions from said composed functions, wherein said stream includes an infinite or a finite number of composed function members;
   applying, by said processor, each composed function member of said stream on each of said plurality of data units to create a set of results;
   analyzing, by said processor, said set of results to identify at least one composed function member of said stream according to a correlation between an outcome of said respective composed function member and a target variable for an analysis of said plurality of data units; and
   outputting, by said processor, said at least one composed function member or an indication thereof;
   wherein said at least one composed function member or indication thereof includes a classifying or predictive function which outputs at least one data classifying or predicting features when applied on a set of data units of a certain type.

2. The method of claim 1, wherein said set of results comprises a plurality of feature vectors, wherein each feature vector is generated by applying one of said building block function members of said function group on each of said plurality of data units.

3. The method of claim 2, wherein said target variable is a classification at a desired ratio;
   said analyzing comprises identifying which of said plurality of feature vectors having features classified at said desired ratio.

4. The method of claim 1, wherein said combining comprises using an output parameter of a first building block function member of said function group as in input parameter of a second building block function member of said function group.

5. The method of claim 1, wherein said combining comprises mapping a statistical usage of building block function members of said function group in a plurality of code samples and selecting building block function members of said function group for creating said plurality of composed functions according to said mapping.

6. The method of claim 1, wherein said combining comprises mapping a statistical usage of building block function members of said function group in a plurality of code samples and defining an order for applying said building block function members of said function group according to said mapping.

7. The method of claim 1, wherein said selecting comprises:
   analyzing said plurality of data units to identify automatically at least one common data type; and
   selecting said function group of building block functions according to said at least one common data type from a dataset of a plurality of building block functions.

8. The method of claim 7, wherein said selecting said function group of building block functions is performed using a hierarchal data type model.

9. The method of claim 7, wherein said selecting said function group of building block functions is performed according to available data unit type conversion functions.

10. The method of claim 7, wherein said plurality of building block functions are clustered to a plurality of function clusters each associated with at least one data unit type;
wherein said selecting comprises matching between said common data type and a respective said at least one data unit type of at least one of said plurality of function clusters; and
selecting said at least one function cluster as said function group.

11. The method of claim 1, wherein each of said plurality of composed functions is generated by compiling at least two building block function members of said function group as nodes of a tree representing a respective said composed function.

12. The method of claim 11, wherein said tree is an abstract syntax tree (AST).

13. The method of claim 1, wherein each of said plurality of composed functions is generated to comply with a set of constraint rules.

14. The method of claim 1, wherein said at least one composed function member is a function for classifying data.

15. The method of claim 1, wherein said at least one composed function member is a predictive function for predicting an outcome or an event.

16. The method of claim 1, wherein said combining is according to an analysis of a corpus of code samples indicating which building block functions are logically combined and how.

17. The method of claim 1, wherein applying comprises applying a composed function member $f$ on each of said plurality of data units to create a Boolean composed function of the form $f(.)=c$, wherein c denotes a member of the set $f(d)$ wherein d denotes a certain data unit.

18. The method of claim 1, wherein applying a composed function member $f$, wherein $f$ returns a collection type, comprises:
applying $f(.)$ on each of said plurality of data units to obtain a set S of collections;
extracting a set C of all constants that appear in at least some collection in S; and
creating a member selected from the group consisting of:
(i) a Boolean function: $f(d)$ contains c, wherein c is a member of set C,
(ii) a numeric function: count $(f(d), c)$, that counts how many elements in $f(d)$ are equal to c, wherein c is a member of set C,
(iii) a numeric function: frequency $(f(d),c)$, that calculates the proportion of elements in $f(d)$ that are equal to c, wherein c is a member of set C, and
(iv) a Boolean function: $g(f(d),c)$ that is created for every Boolean function $g(x,y)$ that is defined for $x=f(d)$ and y in C.

19. A system of identifying at least one classifying or predictive function which outputs at least one data classifying or predicting feature when applied on a set of data units of a certain type, comprising:
an interface which accesses a training set stored as a computer readable data sample of various types and forms in a data sample database, said training set comprising a plurality of data units representing a member selected from the group consisting of: records, events, measurements, estimation, and evaluation, and which accesses building block functions stored in a function database;
a processor in communication with said interface;
a non-transitory computer readable storage medium that when executed by the processor performs the steps of:
selecting a function group of building block functions which are adapted for processing said plurality of data units;
combining building block function members of said function group to create a plurality of composed functions each compiled from at least two building block function members of said function group, to generate a stream of functions from said composed functions, wherein said stream includes an infinite or a finite number of composed function members, to apply each composed function member of said stream on each of said plurality of data units to create a set of results, to analyze said set of results to identify at least one composed function member of said stream according to a correlation between an outcome of said respective composed function member and a target variable for an analysis of said plurality of data units, and to output said at least one composed member or an indication thereof;
wherein said at least one composed function member or indication thereof includes a classifying or predictive function which outputs at least one data classifying or predicting features when applied on a set of data units of a certain type.

20. A non-transitory computer readable storage medium for identifying at least one classifying or predictive function which outputs at least one data classifying or predicting feature when applied on a set of data units of a certain type, that when executed on a processor perform the steps of:
accessing a training set stored as a computer readable data sample of various types and forms in a data sample database, said training set comprising a plurality of data units representing a member selected from the group consisting of: records, events, measurements, estimation, and evaluation;
selecting a function group of building block functions which are adapted for processing said plurality of data units said building block functions stored in a function database accessible by said processor via said interface;
combining building block function members of said function group to create a plurality of composed functions each compiled from at least two building block function members of said function group;
generating a stream of functions from said composed functions, wherein said stream includes an infinite or a finite number of composed function members;
applying each composed function member of said stream on each of said plurality of data units to create a set of results;
analyzing said set of results to identify at least one composed function member of said stream according to a correlation between an outcome of said respective composed function member and a target variable for an analysis said plurality of data units; and
outputting said at least one composed function member or an indication thereof;
wherein said at least one composed function member or indication thereof includes a classifying or predictive function which outputs at least one data classifying or predicting features when applied on a set of data units of a certain type.

21. A computer-implemented method of identifying at least one classifying or predictive function which outputs at least one data classifying or predicting feature when applied on a set of data units of a certain type, comprising:

accessing, by said processor via an interface, a training set stored as a computer readable data sample of various types and forms in a data sample database said training set comprising a plurality of data units representing a member selected from the group consisting of: records, events, measurements, estimation, and evaluation;

selecting, by said processor, a function group of functions which are adapted for processing said plurality of data units, said functions stored in a function database accessible by said processor via said interface;

generating stream of functions from said function group, wherein said stream includes an infinite or a finite number of function members;

applying, by said processor, each function member of said stream of functions on each of said plurality of data units to create a set of results;

analyzing, by said processor, said set of results to identify at least one function member of said stream of functions according to a correlation between an outcome of said respective function member and a target variable for an analysis of said plurality of data units; and outputting, by said processor, said at least one function member or an indication thereof;

wherein said at least one function member indication thereof includes a classifying or predictive function which outputs at least one data classifying or predicting features when applied on a set of data units of a certain type.

* * * * *